United States Patent [19]

Huber

[11] Patent Number: 5,765,869

[45] Date of Patent: Jun. 16, 1998

[54] AUTOMATICALLY TIGHTENED SEATBELT

[76] Inventor: John F. Huber, 14402 N. Tenth St., Phoenix, Ariz. 85022

[21] Appl. No.: 709,289

[22] Filed: Sep. 6, 1996

[51] Int. Cl.$^6$ .............................. B60R 22/36; B60R 22/46
[52] U.S. Cl. .............................. 280/807; 280/733
[58] Field of Search ..................................... 280/806, 733

[56] References Cited

U.S. PATENT DOCUMENTS

| | | | |
|---|---|---|---|
| 3,970,329 | 7/1976 | Lewis | 280/733 |
| 4,348,037 | 9/1982 | Law et al. | 280/733 |
| 5,288,104 | 2/1994 | Chen | 280/733 |
| 5,492,368 | 2/1996 | Pywell et al. | 280/806 |
| 5,568,940 | 10/1996 | Lane, Jr. | 280/806 |

*Primary Examiner*—Kenneth R. Rice
*Attorney, Agent, or Firm*—John R. Benefiel

[57] ABSTRACT

A safety seatbelt which is designed to be worn slack and which is automatically tightened by expansion of a woven retraction tube disposed within a cover tube acting as the seatbelt. The retraction tube has a weave that causes considerable shortening (minimum 50% of length) when expanded and is attached to the cover tube to cause a corresponding section of a flexible lengthwise contraction of the cover tube and thereby shorten the belt. A self-contained gas generator and collision sensor in a belt latch piece socket direct a gas into a bladder tube within the retraction tube to expand the retraction tube and shorten the belt when a collision of a predetermined severity occurs and thereby cause the belt to be tightened.

10 Claims, 4 Drawing Sheets

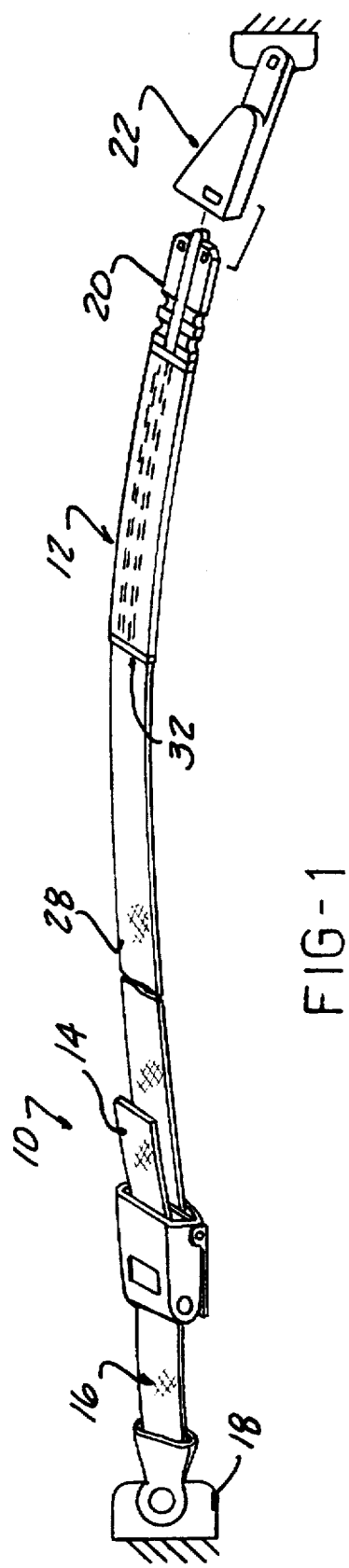
FIG-1
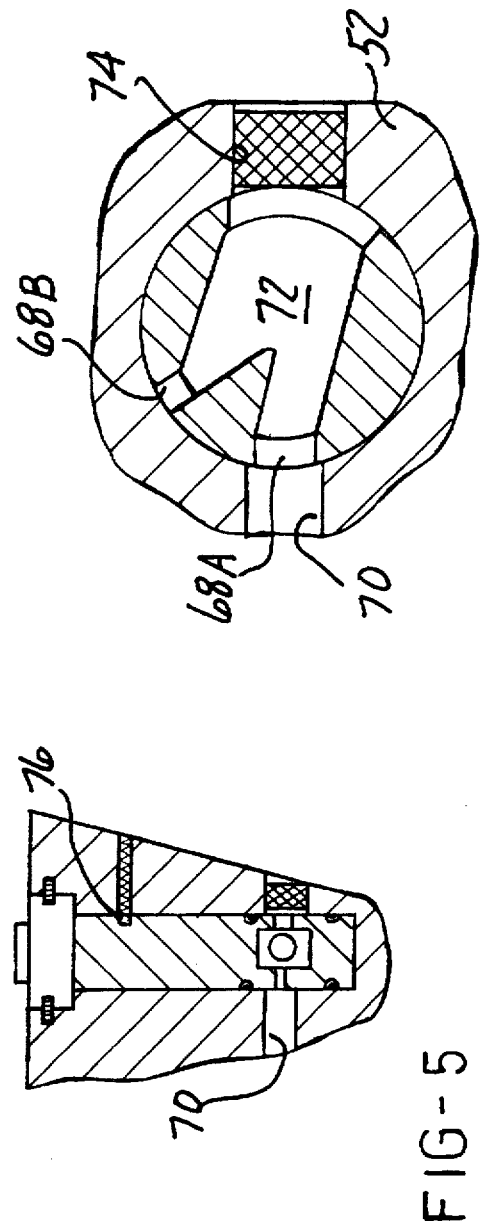
FIG-6
FIG-5

AUTOMATICALLY TIGHTENED SEATBELT

BACKGROUND OF THE INVENTION

This invention concerns safety seatbelts and more particularly a seatbelt which is automatically tightened around the wearer in the event the vehicle in which he or she is seated is involved in a serious collision.

Safety seatbelt systems for automotive vehicles often have an arrangement for allowing free movement of the wearer by allowing the belt to develop slack as the passenger leans forward. Such arrangements conveniently allow the belt wearer normal movements, such as reaching for items or instrument panel controls without the need for unbuckling the seatbelt. When a serious collision is detected, the seatbelt is locked to secure the wearer in his or her seat.

U.S. Pat. No. 5,326,043 issued on Jul. 5, 1994 for a "Seat Belt Retractor" describes an automatically activated clamping mechanism for the seatbelt.

It is also desirable for the belt to have considerable slack so as to not normally exert any pressure on the wearer so as to avoid any discomfort of wearer due to the belt. Even moderate pressure can be uncomfortable on long trips. Various safety belt automatic tightening arrangements have been devised to allow the belt to be worn in very slack conditions.

U.S. Pat. No. 4,232,886 issued on Nov. 11, 1980 for a "Tensioning Device for Seat Belt" describes an inflatable body which is connected to the seatbelt. When a collision is sensed, high pressure gas causes the body to extend to pull the seatbelt tight.

U.S. Pat. No. 3,879,054 issued on Apr. 22, 1975 for a "Device for Tightening for a Belt Forming Part of a Safety Harness Assembly for Vehicles" describes a piston-cylinder actuator opening in a generally similar fashion to the '886 patent.

U.S. Pat. No. 4,223,917 issued on Sep. 23, 1980 for a "Traction Device for Safety Belts" describes a flexible tube which is rolled up and which is wound up upon being inflated to pull a seatbelt to a tensioned condition.

All of the above devices use relatively bulky equipment and require considerable space within which to operate. The components are also relatively complex, such as to be costly to manufacture and requiring maintenance.

It is the object of the present invention to provide a simple, reliable, and trouble-free safety seatbelt tensioner, which is also compact and does not require substantially more space than existing seatbelts which are not equipped with this feature.

SUMMARY OF THE INVENTION

The above object and others which will be understood upon a reading of the following specification and claims are achieved by incorporating a pressure shortening section in a flattened tubular safety belt. The shortening section includes a woven strand retraction tube having a particular weave configuration such that when expanded, a dramatic shortening in tube length occurs. The retraction tube expansion is carried out by inflation of an inner bladder tube.

The retraction tube is enclosed in the tubular belt, which tubular belt also forms the remaining sections of the belt, the woven retraction tube connected to the remaining belt sections to cause considerable endwise contraction and shortening of the length at the outer belt when the retraction tube is shortened.

The inner bladder tube is inflated by a gas generator activated by a collision sensor, both housed in a socket receiving a latch piece attached to the seatbelt.

The gas generated flows into the inflatable tube, through a fill pipe placed in communication with the gas generator when the seatbelt latch piece is inserted in the socket. A check valve holding gas in the bladder tube until the latch piece is released.

A selector valve allows a portion of the gas to be vented to selectively reduce the volume of gas directed to the inflatable tube. This varies the pressure in the inflated tube to provide sufficient tension in the belt to restrain persons of different weight.

A valve sleeve has two differently sized various sized ports, each which when positioned to allow gas flow vent a proportion of the gas generated, while in a third position, venting is entirely blocked to create maximum flow volume to the inflatable bladder tube.

The system can be applied to a shoulder and lap safety belt, using a single belt latch piece to inflate inflatable tube segments in both the shoulder and lap belts.

DESCRIPTION OF THE DRAWINGS

FIG. 1 is a perspective view of lap belt application of the invention.

FIG. 5 is an enlarged lengthwise sectional view of the selector valve sleeve installation incorporated in the socket shown in FIGS. 1, 2, and 4.

FIG. 6 is a transverse sectional view taken through the valve sleeve installation shown in FIG. 5.

DETAILED DESCRIPTION

Figure 3:
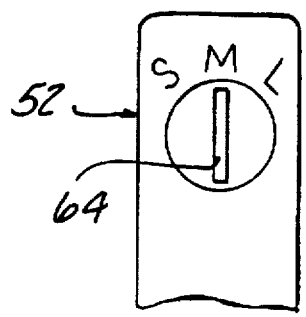
FIG. 3 is a fragmentary enlarged plan view of the size selector dial incorporated in the anchor shown in FIG. 2.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, FIG. 1 illustrates a lap belt 10 which includes a shortening section 12 according to the invention, having a length approximately equal to one third of the total length of the belt.

The lap belt 10 is of a general configuration as is in use in aircraft, including a length adjustment buckle 14 connected to an anchored section 16, secured by a swivel joint 18 mounted to fixed structure as indicated.

The shortening section 12 has a latch piece 20 attached at its free end of a special design according to the present invention adapted to mate with a latch socket 22, mounted to a fixed structure as illustrated.

Figure 4:
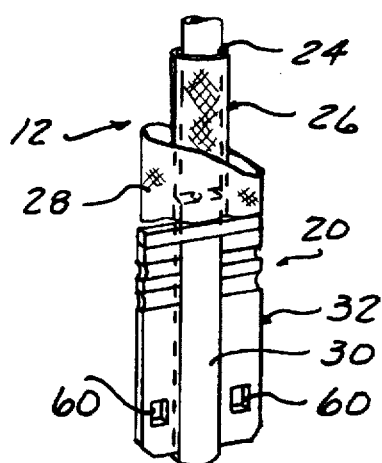
FIG. 4 is a sectional view taken lengthwise through the belt latch and socket shown in FIGS. 1 and 2.
Figure 4:
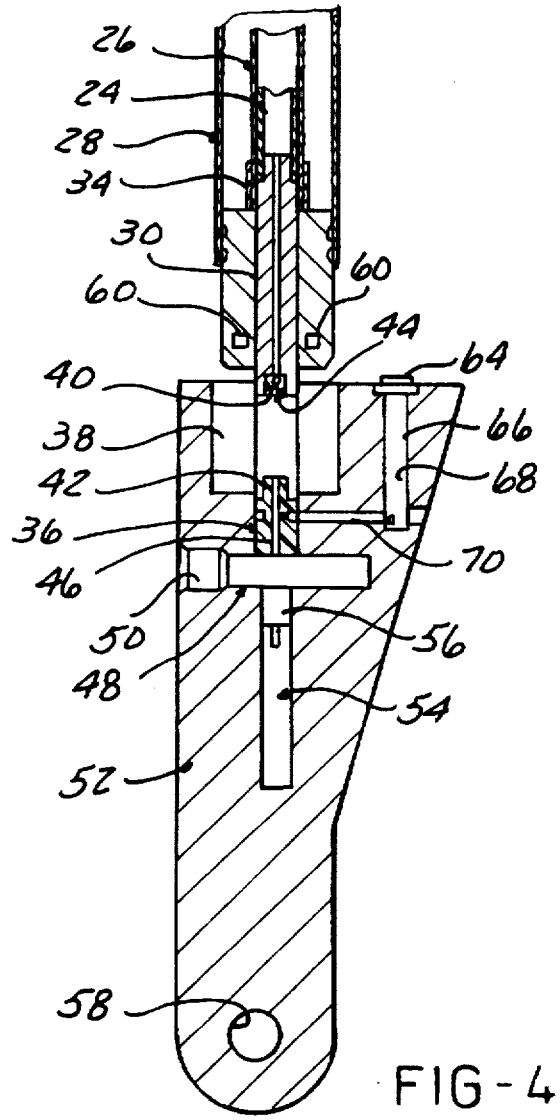
Figure 2:
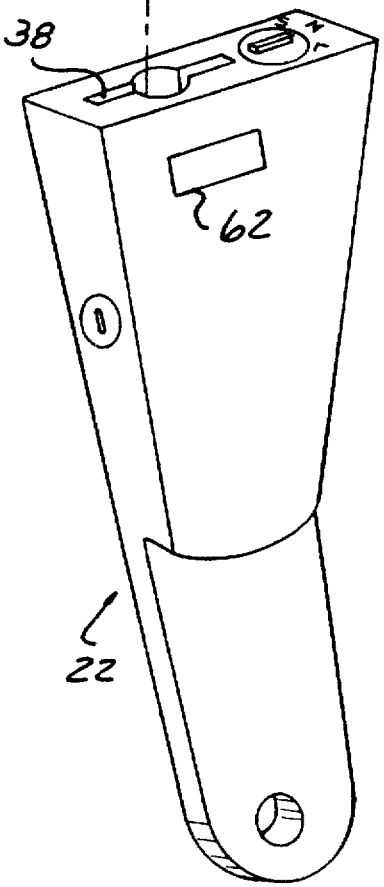
FIG. 2 is an exploded fragmentary view of the belt latch piece and socket for the lap belt shown in FIG. 1.
Figure 13:
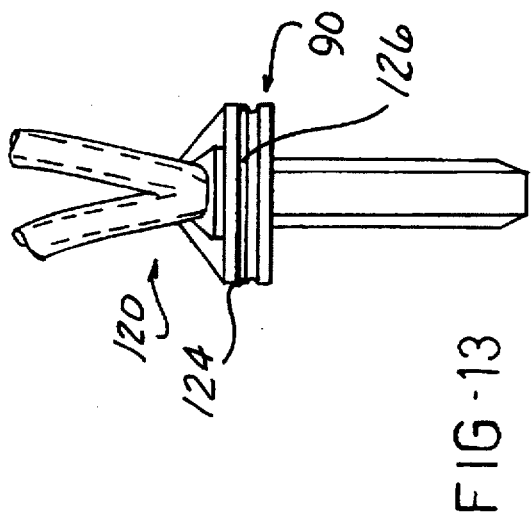
FIG. 13 is a plan view of the end installed on a latch piece.

FIGS. 2–4 show the details of the construction of the shortening belt segment 12 as well as the latch piece 20 and latch socket 22.

The shortening section 12 includes an inflatable tubular bladder 24 extending within a retraction tube 26, both tubes enclosed in an outer woven fabric belt tube 28 normally in a flattened state and providing the primary force resisting strength of the lap belt 10. One end of the retraction tube 26 is received over one end of the short fill pipe 30 fixed to the latch piece 20 and projecting above a flat blade portion 32 of the latch piece 20. The one end of the retraction tube 26 is fixedly secured to the fill pipe 30 with a clamping band 34, while the other end is sewn to the belt outer woven belt tube 28 at 32 (FIG. 1) so as to be able to resist the full force developed when the user's body is restrained by the belt 10 during a collision.

The bladder tube 24 is also received and secured in position over the upper end of the fill pipe 30, with clamping band 34 maintaining the retraction tube 26 securely attached to the latch piece 20 and also creating a sealed connection of the bladder tube 24 to the fill pipe 30.

The opposite lower end of the fill pipe 30 is positioned to be received over an upwardly projecting stem 36 mounted at the bottom of a slotted cavity 38 in the latch socket 22 configured to mate with the latch piece 20.

The lower end of the fill pipe 30 has an enlarged recess 40 sized to receive the upwardly projecting end of the stem 36, sealed with an O-ring 42.

A check valve 44 is mounted in the recess 40 which allows gas flow from the interior passage 46 within the stem 36.

A gas generator cartridge 48 inserted through a side port 50 in a housing member 52 of the latch socket 22 communicates a gas discharge from the generator into passage 46, which flows then through the filler pipe 30 and into the inflatable tube 24.

An impact sensor 54 and ignition device activate the gas generator 48 upon sensing that the vehicle is in a collision of sufficient severity to raise the possibility of injury.

Such gas generators, collision sensors, and ignition devices are well known in the art and since suitable such devices are commercially available, these components will not be described herein in further detail.

The housing 52 is formed with a hole 58 at its lower end for mounting to an anchor in conventional fashion.

The blade portion 32 is formed with locking apertures 60 which are engaged with spring loaded locking elements (not shown) when the latch 20 is inserted fully into the socket cavity 38, the elements released by depressing a release button 62. Any conventional latching mechanism used for such applications may be employed.

A size selector control knob 64 is also included facing out from the upper surface of the housing 52. The control knob 64 is integral with a valve sleeve element 66 inserted in a bore entering into the housing 52 from its upper surface.

As best seen in FIGS. 5 and 6, the lower end of the valve sleeve element 66 is formed with a pair of differently sized ports 68A, 68B, able to be selectively aligned with a vent passage 70 communicating with the passage 46 in the stem 36 by rotating the valve element 66.

Each port 68A, 68B opens into a cross passage 72 machined into the valve element 66 which opens into a vent port 74 in housing 52 aligned with the vent passage 70, but on the opposite side of valve element 66.

A vent filter 76 in the port 74 can be employed to trap any particles and to quiet the outflow of gas venting through from passage 70.

The valve element 66 may also be provided with a spring-loaded detent pin 76 which engages successive pockets on the valve element to detent the valve sleeve element in three rotated positions, a first position with port 68A aligned with vent passage 70, a second position with port 68B in alignment with passage 70, and a third position in which the vent passage 70 is blocked by the outer surface of valve sleeve element 66. A dual action setting selector motion may be utilized, such as a push-and-turn, to reduce the incidence of inadvertent changes in setting, as by child tampering.

As shown in FIG. 3, a designation for each position may be imprinted to align with the knob 64. In the small or "S" position, a maximum volume of gas is vented; in the medium or "M" position, a smaller volume is vented; and, in the large or "L" position, passage 70 is blocked by the element 66 and no gas is vented.

The gas generated is used to inflate the tube 24 which in turn expands the retraction tube 26.

Retraction tube 26 is woven from metal wire strands or high strength plastic filament, woven in a pattern causing a marked shortening of the tube 26 when expanded by the inflation of the bladder tube 24.

Figure 7:
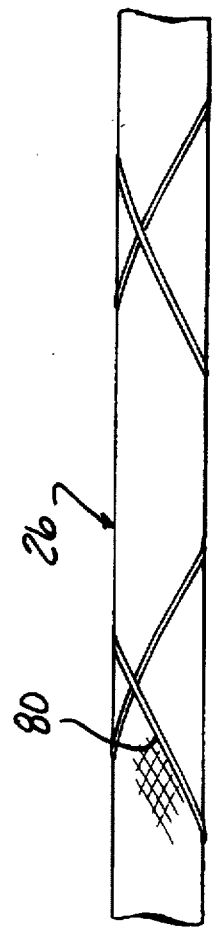
FIG. 7 is a plan view of a woven retraction tube incorporated in the lap belt shown in FIG. 1, shown in the relaxed state.
Figure 8:
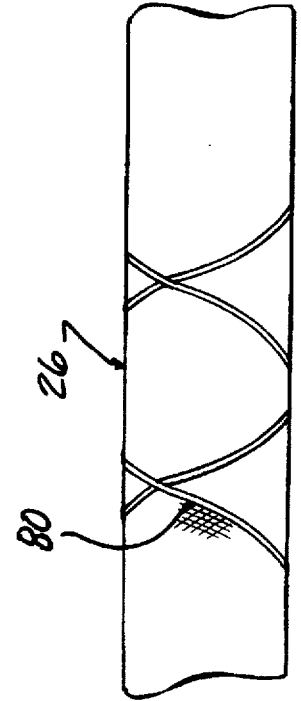
FIG. 8 is a plan view of the woven retraction tube of FIG. 7, but shown in the expanded, shortened condition.

FIGS. 7 and 8 show this effect, in which helically wound strands 80, initially extending at a very steep helix angle, are caused to shift to a much shallower helix angle when the tube 26 is expanded. The strands react on each other to greatly shorten the length of the tube 26 when this happens. This is the well known principle of the "Chinese finger trap".

Thus, the pressure within the tube determines the pressure which is available to resist movement of the wearer, which pressure should be at a maximum for the heaviest persons, less for medium weight wearers, and at a minimum for the lightest persons. However, no harm will occur if the maximum gas output is provided to a small-sized person (child). The effective "length" of the shortening section is part of this design. A strap with a full length shortening section will exert more "holding force" than a strap with a shorter shortening section. The user may request a length suitable for his or her needs.

Figure 9:
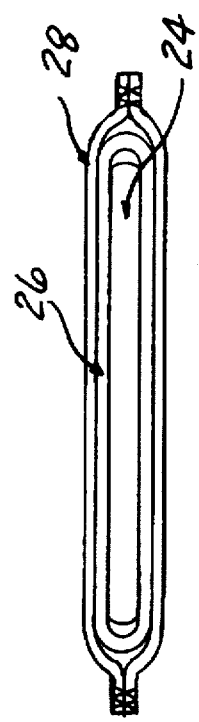
FIG. 9 is a transverse sectional view of the shortening belt section shown in FIG. 1.

FIG. 9 shows the layering of the outer woven tube 28 with the retraction tube 26 and bladder tube 24. When the retraction tube 26 shortens, the outer woven fabric tube 28 is contracted endwise to in effect also shorten the belt 10 and secure the wearer tightly with a pressure proportioned to the weight range of the wearer.

Figure 10:
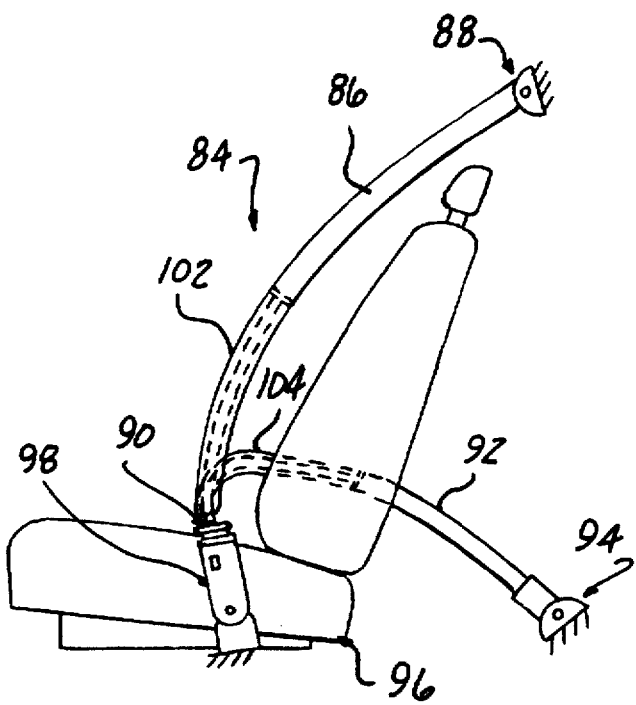
FIG. 10 is a side view of an auto seat equipped with a combined lap and shoulder belt according to the invention.

The invention is also applicable to a three point shoulder-lap belt harness 84 as shown in FIG. 10.

The shoulder belt 86 has its upper end anchored to a fixed structure 88 while its lower end is mounted to a dual belt latch piece 90. Similarly, the lap belt 92 has a rear end anchored to fixed structure 94 behind a seat 96 and its forward end also connected to the dual belt latch piece 90.

A latch socket 98 is mounted to fixed structure 100 along one side of the seat 96.

The shoulder belt 86 has a shortening section 102, and lap belt has a shortening section 104 at the ends connected to the latch piece 98.

Figure 11:
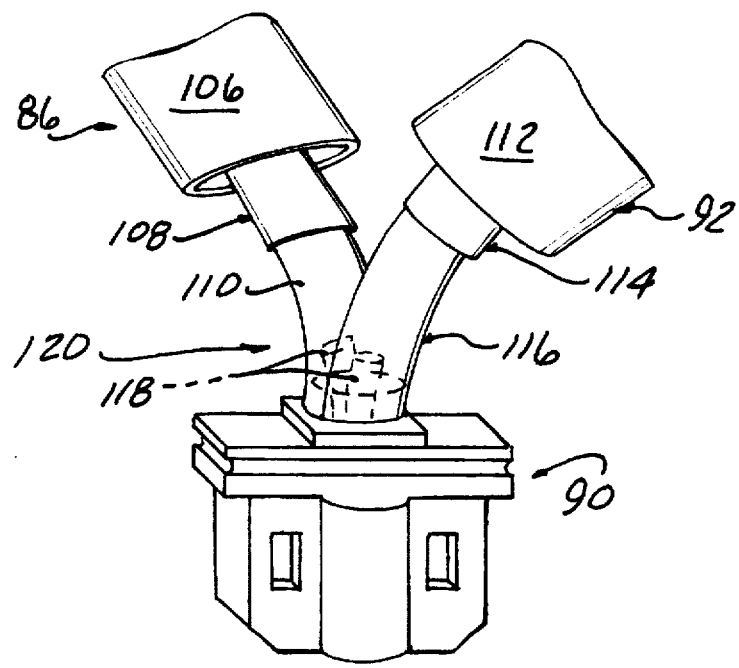
FIG. 11 is a perpendicular enlarged view of the connection of the lap and shoulder belts to the latch component.

FIG. 11 shows that shoulder belt 86 in its shortening section has an outer woven fabric tube 106, a retraction tube 108, and bladder tube 110. The lap belt 92 similarly has an outer woven fabric tube 112, a retraction tube 114, and a bladder tube 116.

The upper end of the latch piece 90 is configured with two filler pipes 118, each connected to a respective set of retraction tubes 108 and 114 and bladder tubes 110 and 116.

Figure 12:
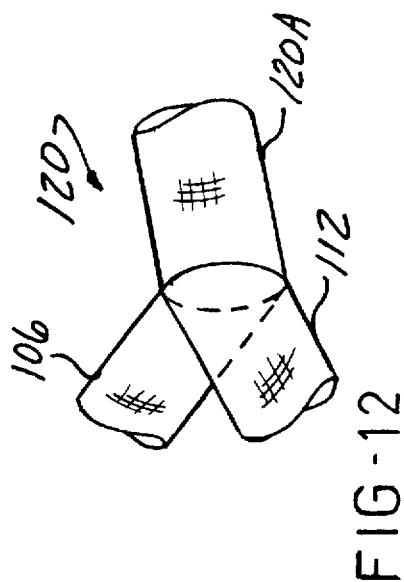
FIG. 12 is a fragmentary perspective view of an end of the outer covering of the lap and shoulder belts.

The outer woven fabric tube has a spliced end 120 as shown in FIG. 12, with the single end 12A mounted over a block 122 of the latch piece 90 with a cinch 124 received in a groove 126 to establish a connection as shown in F.

I claim:

1. An improved safety seatbelt of the type securing a wearer in a vehicle seat by anchoring either end to fixed structure on either side of said seat to extend across the body of said wearer, said belt improvement comprising:

detector means for detecting a collision of said vehicle of a predetermined severity;

means for causing endwise contraction of at least one section of said belt to thereby shorten said belt in response to detection of a collision of said vehicle of said predetermined severity, whereby said belt can be worn loosely and automatically tightened in the event of a severe collision.

2. The seatbelt according to claim 1 wherein said means for causing an endwise contraction of said belt section includes an elongated flexible tube comprising at least a section of said belt, an elongated retraction tube mounted at at least one end to said seatbelt, said retraction tube of a woven construction such as to contract endwise when expanded; and means for expanding said retraction tube to cause contraction thereof; said retraction tube fixed to said belt to cause said endwise contraction and shortening of said belt when said retraction tube is expanded and contracts.

3. The seatbelt according to claim 2 wherein said means for expanding said retraction tube includes an inflatable bladder tube disposed within said retraction tube, and also includes means for inflating said bladder tube.

4. The seatbelt according to claim 3 wherein said belt includes a latch piece mounted at one end thereof and a latch socket housing mounted to fixed structure and having a cavity configured to receive said latch piece inserted therein, with latch means releasably securing said latch piece inserted in said socket cavity; said means for inflating said bladder tube includes gas generator means in said latch socket housing generating a flow of gas upon detection of a collision by said detector means, and also includes fluid connection means directing said flow of gas into said bladder tube.

5. The seatbelt according to claim 4 wherein said fluid connection means includes a fluid coupling established by insertion of said latch piece in said socket cavity.

6. The seatbelt according to claim 5 further including check valve means preventing release of gas from said inflatable tube until said latch piece is released from said socket.

7. The seatbelt according to claim 2 wherein said belt comprises an outer cover tube having a section extending over said retraction tube, said retraction tube fastened relative to said covering tube at either end.

8. The seatbelt according to claim 4 wherein said belt comprises an outer covering tube having a section receiving said retraction tube and bladder tube, said retraction tube having one end fastened to said outer cover tube, and another end mounted to said latching piece, said cover tube having one end also mounted to said latch piece.

9. The seatbelt according to claim 8 wherein said latch piece has a filler pipe extending into said bladder tube received thereover, said filler pipe included in said fluid connection means.

10. The seatbelt according to claim 4 further including selectively set valve means having a series of positions, in at least some of which venting is carried out of a predetermined portion of said gas generated by said gas generator means to selectively allow different pressures to be established in said bladder tube.

* * * * *